(12) United States Patent
Chen et al.

(10) Patent No.: US 11,701,738 B2
(45) Date of Patent: Jul. 18, 2023

(54) LASER WELDED ASSEMBLY HAVING A HEAT AFFECTED ZONE REINFORCEMENT AND METHOD OF MAKING THE SAME

(71) Applicants: GM Global Technology Operations LLC, Detroit, MI (US); Penn State Research Foundation, University Park, PA (US)

(72) Inventors: Nannan Chen, State College, PA (US); Joshua L. Solomon, Berkley, MI (US); Hui-Ping Wang, Troy, MI (US); Zixuan Wan, State College, PA (US); Blair E. Carlson, Ann Arbor, MI (US); Paulina G. Torres Guzman, Dearborn, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 87 days.

(21) Appl. No.: 17/036,786

(22) Filed: Sep. 29, 2020

(65) Prior Publication Data
US 2022/0097172 A1 Mar. 31, 2022

(51) Int. Cl.
*B23K 26/24* (2014.01)
*B23K 26/70* (2014.01)
*B23K 101/00* (2006.01)

(52) U.S. Cl.
CPC .............. *B23K 26/24* (2013.01); *B23K 26/70* (2015.10); *B23K 2101/006* (2018.08)

(58) Field of Classification Search
CPC ..... B23K 26/24; B23K 26/70; B23K 2101/006
USPC .......................................... 219/121.6, 121.63
See application file for complete search history.

(56) References Cited

U.S. PATENT DOCUMENTS

| 4,873,415 | A | * | 10/1989 | Johnson | ................ | B23K 26/32 |
| | | | | | | 219/121.64 |
| 10,155,285 | B2 | * | 12/2018 | Fujiwara | ............... | B23K 26/082 |
| 2008/0296271 | A1 | * | 12/2008 | Klein | .................. | B23K 26/123 |
| | | | | | | 219/121.64 |
| 2009/0324987 | A1 | * | 12/2009 | Copley | ................... | B32B 15/20 |
| | | | | | | 228/175 |
| 2019/0126402 | A1 | * | 5/2019 | Yang | ..................... | B23K 26/044 |
| 2020/0114469 | A1 | * | 4/2020 | Tao | ...................... | B23K 26/244 |
| 2020/0316713 | A1 | * | 10/2020 | Yang | ..................... | B23K 26/22 |

\* cited by examiner

*Primary Examiner* — Tu B Hoang
*Assistant Examiner* — Albat Rosario-Aponte
(74) *Attorney, Agent, or Firm* — Vivacqua Crane, PLLC

(57) ABSTRACT

A laser welded assembly and method of making. The laser welded assembly includes a first work piece having a thickness (T1) defined between an external surface and a faying surface; a second work piece having a thickness (T2) defined between an external surface and a faying surface of the second work piece; a weld seam having a core fusion zone extending from the external surface of the first work piece through the faying interface and at least partially into the thickness (T2) of the second work piece; and a protruding fusion zone extending laterally from the core fusion zone adjacent to the external surface of the first work piece. The protruding fusion zone may be formed by post-heating or concurrently with the core fusion zone.

11 Claims, 7 Drawing Sheets

LASER WELDED ASSEMBLY HAVING A HEAT AFFECTED ZONE REINFORCEMENT AND METHOD OF MAKING THE SAME

INTRODUCTION

The present disclosure relates to a laser welded assembly, more particularly to laser welded assembly having a heat affected zone reinforcement and a method of making the same.

Automotive body components such as quarter panels, door assemblies, underbody panel members, seat frames, and the likes, are typically assembled by overlapping two or more metal panel members, also referred to as metal work pieces, in which the overlapped portions of the metal panel members are joined by fusion welding, such as resistance spot and conventional arc welding. Recently, laser welding has been adopted as a replacement method for conventional resistance spot and conventional arc welding.

Laser welding is a metal joining process in which a laser beam is directed at a surface of a stacked or overlapping assembly of metal panel members to provide a concentrated heat source capable of effectuating a joint in fusing the metal panel members together. Laser welding uses energy source of much smaller size and much higher energy density than conventional arc welding and hence weld a very precise location while providing a narrower weld bead having an excellent depth-to-width ratio. The weld bead is also referred to as a weld seam.

However, heat affected zones (HAZ) still exist in the narrow laser welds although narrower compared to the one in an arc weld. The strength of the laser weld may be adversely affected by the HAZ formed immediately adjacent to the weld seam during the laser welding process. The HAZ is a non-melted area of metal that has undergone changes in material properties as a result of being exposed to high temperatures. The high temperature of laser welding tempers the metal immediately adjacent the laser weld bead, thus forming an over-tempered softened HAZ adjacent the laser weld seam. The HAZ weakens the joint strength and energy absorption of the overlapping portions of the metal panel members since the HAZ is close to the notch root area where stress is concentrated under loading condition.

Thus, while laser welding of overlapping portions of metal panel members achieve their intended purpose for making a laser welded assembly, there is a need for a more robust laser welded assembly and a method of making a laser welded assembly having a reinforced HAZ.

SUMMARY

According to several aspects a welded assembly is disclosed. The welded assembly includes a first work piece having an external surface, a faying surface opposite the external surface, and a thickness (T1) defined between the external surface and the faying surface of the first work piece; and a second work piece having an external surface, a faying surface opposite the external surface, and a thickness (T2) defined between the external surface and the faying surface of the second work piece, wherein the faying surface of the first work piece is in abutting contact with the faying surface of the second work piece to define a faying interface. A weld seam having a core fusion zone extends from the external surface of the first work piece through the faying interface and at least partially into the thickness (T2) of the second work piece. A protruding fusion zone extends laterally from the core fusion zone adjacent to the external surface of the first work piece.

In an additional aspect of the present disclosure, the protruding fusion zone includes a boundary defined between a first radius (R1) adjacent to the external surface of the first work piece and a second radius (R2) proximal to the faying interface. The first radius (R1) and second radius (R2) extend radially from an axis along the core fusion zone. The first radius (R1) is greater than the second radius (R2).

In another aspect of the present disclosure, the first work piece includes a softened anneal zone following the boundary of the protruding fusion zone.

In another aspect of the present disclosure, the boundary of the protruding fusion zone includes a bowl shape profile defined between the first radius (R1) and the second radius (R2).

In another aspect of the present disclosure, a tangent line (L) extending from a point on the boundary of the protruding fusion zone to the joint faying interface at the core fusion zone defines an angle (a) less than 90 degrees relative to the joint faying interface.

In another aspect of the present disclosure, the angle (a) is between about 15 degrees to about 75 degrees.

In another aspect of the present disclosure, the protruding fusion zone is formed by post-heating the first work piece by directing a laser onto the external surface of the first work piece along a predetermined lateral portion of the core fusion zone.

In another aspect of the present disclosure, the protruding fusion zone is concurrently made with the core fusion zone by directing a defocused laser onto the external surface of the first work piece.

In another aspect of the present disclosure, the protruding fusion zone extending laterally from the core fusion zone from the external surface of the first work piece to proximal to the faying surface of the first work piece within the first thickness (T1) of the first work piece.

In another aspect of the present disclosure, the weld seam is a laser weld seam.

According to several aspects, a method of making a laser welded assembly is disclosed. The method includes arranging a first work piece and a second work piece such that a faying surface of the first work piece is in abutting contact with a faying surface of the second work piece; directing a laser beam applying a welding schedule onto an external surface of the first work piece effective to form a laser weld seam having a core fusion zone extending through the first work piece and at least partially into the second work piece to fuse the first work piece to the second work piece; and directing the laser beam applying a post-heating schedule onto the external surface of the first work piece immediately lateral to the laser weld seam to form a protruding fusion zone extending from the core fusion zone.

In an additional aspect of the present disclosure, the laser applying the post-heating schedule is effective to form a protruding fusion zone having a boundary defining a bowl shape profile.

In another aspect of the present disclosure, the post-heating schedule is effective to form a softened anneal zone within a thickness (T1) of the first work piece. The softened annealed zone is adjacent to and follows the contour of the boundary of the protruding fusion zone.

In another aspect of the present disclosure, the step of applying the post-heating schedule is performed immediately after directing the laser beam having the welding schedule before a solidification of the core fusion zone.

In another aspect of the present disclosure, the laser beam is a defocused laser beam.

In another aspect of the present disclosure, the defocused laser beam includes a radius at least the first thickness (T1) of the first work piece.

In another aspect of the present disclosure, the defocused laser beam includes an oscillation amplitude at least the first thickness (T1) of first work piece.

In another aspect of the present disclosure, when directing the laser beam applying the post-heating schedule forms a surface groove between the core fusion zone and protruding fusion zone, then direct the laser beam closer to the core fusion zone.

According to several aspects, a laser welded automotive structural component having: a first work piece having an external surface, a faying surface opposite the external surface, and a thickness (T1) defined between the external surface and the faying surface of the first work piece; a second work piece having an external surface, a faying surface opposite the external surface, and a thickness (T2) defined between the external surface and the faying surface of the second work piece, wherein the faying surface of the first work piece is in abutting contact with the second work piece to define a faying interface; a weld seam having a core fusion zone extending from the external surface of the first work piece through the faying interface and at least partially into the thickness (T2) of the second work piece; and a protruding fusion zone extending laterally from the core fusion zone adjacent to the external surface of the first work piece. The weld seam defines an elongated C-shape. The protruding fusion zone is adjacent to a predetermined portion of the elongated C-shape.

In an additional aspect of the present disclosure, the protruding fusion zone includes a boundary defined between a first radius (R1) adjacent to the external surface of the first work piece and a second radius (R2) proximal to the faying interface, wherein a boundary defined between the first radius (R1) and second radius (R2) defines a bowl shape profile.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate like corresponding parts throughout the several drawings. The figures are not necessarily to scale and some features may be exaggerated or minimized to show the details of particular features. The specific structural and functional details disclosed are not intended to be interpreted as limiting, but as a representative basis for teaching one skilled in the art as to how to practice the disclosed concepts.

Figure 1:
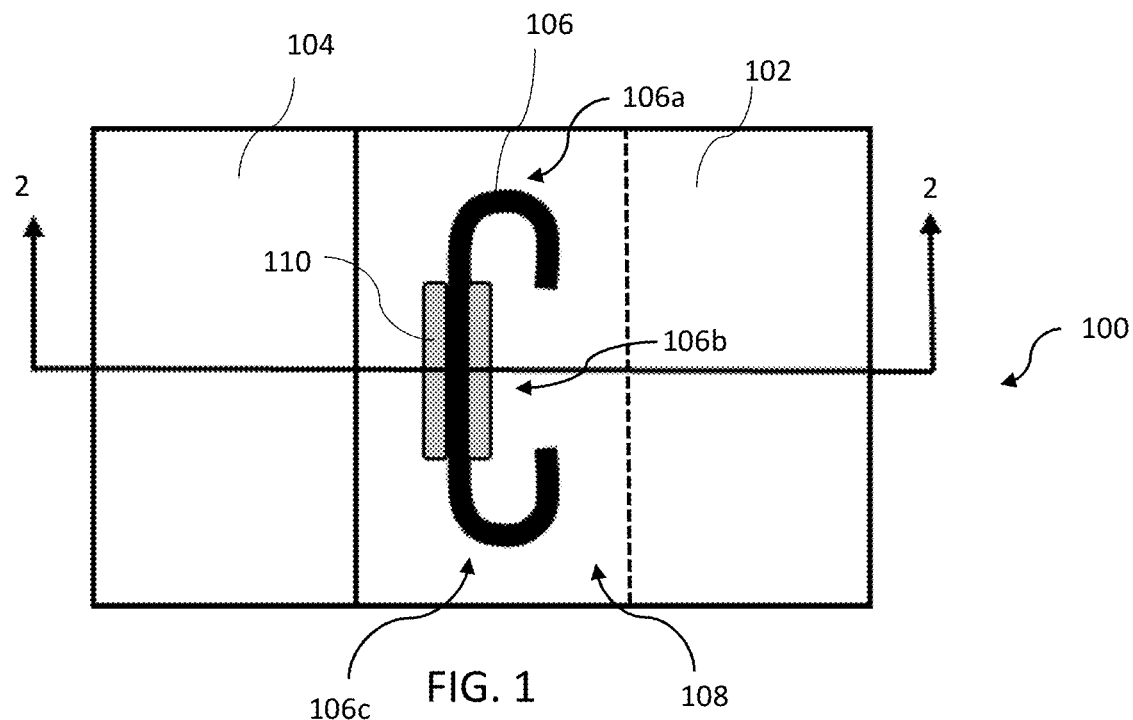
FIG. 1 is a schematic top view of a laser welded assembly having a heat affected zone (HAZ) reinforcement, according to an exemplary embodiment.

FIG. 1 shows a top view of a laser welded assembly 100 having a first work piece 102 in overlapping contact with a second work piece 104 and a laser weld 106 in an overlapping region 108 joining the first work piece 102 to the second work piece 104. The first and second work pieces 102 and 104 may be comprised of a wide variety of steels including a low carbon steel (also referred to as mild steel), an interstitial-free (IF) steel, a high-strength low-alloy (HSLA) steel, or an advanced high strength steel (AHSS). The first and second work pieces 102 and 104 may also be comprised of other metals such as aluminum, copper, etc. that are capable of being laser welded.

The laser weld 106, also referred to as a weld bead 106 or weld seam 106, is formed by directing a laser beam through a predetermined pattern across a portion of an overlapping region 108 of the first work piece 102 and the second work piece 104. In the exemplary embodiment shown, the predetermined pattern of the laser weld seam 106 is shown as having an elongated C-shape. The elongated C-shape includes a first curved end portion 106a, a center linear portion 106b, and a second curved end portion 106c. The laser weld seam 106 includes a heat affected zone (HAZ) reinforcement 110 on at least one lateral side of the weld seam 106. The HAZ reinforcement 110 is described in detail below.

The first work piece 102 and the second work piece 104 may represent metal subassemblies that are fitted and joined together into a structural assembly 100 for an automotive vehicle (not shown). For example, the structural assembly 100 may be that of a vehicle door assembly, in which the first work piece 102 represents an inner door panel and the second work piece 104 represents an outer door panel. The inner and outer door panels are arranged and stacked relative to each other. The overlapping regions of the panels are joined by a plurality of laser welds to form a completed vehicle door assembly. The joined overlapping regions require sufficient strength and durability to withstand the stress and strain incurred from normal vehicle operations. HAZ reinforcements 110 are incorporated into selected portions of the laser weld seam 106 to improve the strength and durability of the laser weld in joining the panels. For vehicle structural components, it is preferable that the first and second work pieces 102, 104 are formed of a steel alloy having a tensile strength of 980 MPa or more.

Figure 2:
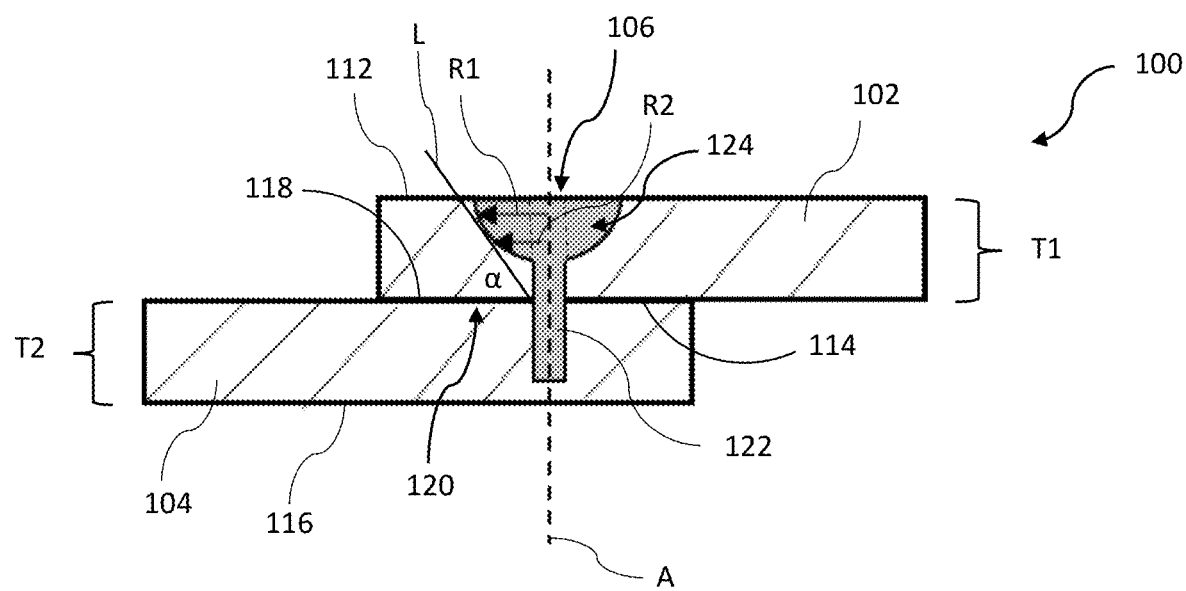
FIG. 2 is a schematic cross-sectional view of the laser welded assembly of FIG. 1 across section line 2-2, according to an exemplary embodiment.

FIG. 2 shows cross-sectional view of the laser welded assembly 100 of FIG. 1 across a section line 2-2 perpendicular to the weld seam 106. The first work piece 102 includes an external surface 112, a faying surface 114 opposite the external surface 112, and a thickness (T1) defined between the external surface 112 and the faying surface 114. Similarly, the second work piece 104 includes an external surface 116, a faying surface 118 opposite the external surface 116, and a thickness (T2) defined between the external surface 116 and the faying surface 118. The first work piece 102 and the second work piece 104 are arranged and assembled such that the faying surface 114 of the first work piece 102 is in abutting contact with the faying surface 118 of the second work piece 104 to form an overlapping joint interface 120, also referred to as a faying interface 120.

The laser weld includes a core fusion zone 122 extending along an A-axis from the external surface 112 of the first work piece 102 through the overlapping joint interface 120 and at least partially into the second work piece 104. In the embodiment shown, the core fusion zone 122 penetrates into the second work piece 104 proximal to the external surface 116 of second work piece 104. In another embodiment, the fusion zone may penetrate through the entire thickness (T2) of second work piece 104 to the external surface 116 of the second work piece 104.

The core fusion zone 122 is formed by focusing, directing, and guiding a laser beam through a predetermined pattern onto the external surface 112 of the first work piece 102. An exemplary predetermined pattern is the elongated C-shape shown in FIG. 1. The laser beam generates sufficient heat to melt a portion of the first work piece 102 and a portion of the second work piece 104. The molten portions of the work pieces quickly cools and solidifies into a trail of re-solidified material defining the core fusion zone 122, thereby fusing the first work piece 102 and the second work piece 104 together at the overlapping joint interface 120.

Best shown in FIG. 2, the laser welded assembly 100 includes a HAZ reinforcement 124 in a form of a laterally protruding fusion zone 124 extending from at least one side of the A-Axis of the laser weld seam 106. The laterally protruding fusion zone 124 is formed by post-heating with a laser beam immediately after the laser weld seam 106 is formed. Alternatively, the laterally protruding fusion zone 124 is formed concurrently with the laser weld seam 106 by using a defocused laser beam. The post-heating with the laser beam and/or the use of a defocused laser beam in forming of the laterally protruding fusion zone 124 affects the HAZ in a manner that reinforces the joint interface 120, which is discussed in detail below.

The laterally protruding fusion zone 124 includes a first radius (R1) and a second radius (R2) extending from the A-axis. The first radius is immediately adjacent to the external surface 112 of the first work piece 102 and the second radius is proximal to the overlapping joint interface 120. The laterally protruding fusion zone 124 may be tapered such that the first radius is larger than the second radius. In other words, the laterally protruding fusion zone 124 is tapered from wide to narrow toward the joint interface 120. In one embodiment, the laterally protruding fusion zone 124 defines a tapered linear boundary. In another embodiment, the laterally protruding fusion zone 124 defines a curved boundary, such as that of a cross-sectional profile of a bowl. It is preferred that the first radius is equal to or substantially the same as the thickness (T1) of the first work piece 102. A tangent line (L) extending from a point on the boundary of the laterally protruding fusion zone 124 to the core fusion zone 122 at the joint interface 120 defines an angle (a) of less than 90 degrees relative to the joint interface 120, preferably between about 15 to 75 degrees.

Figure 3:
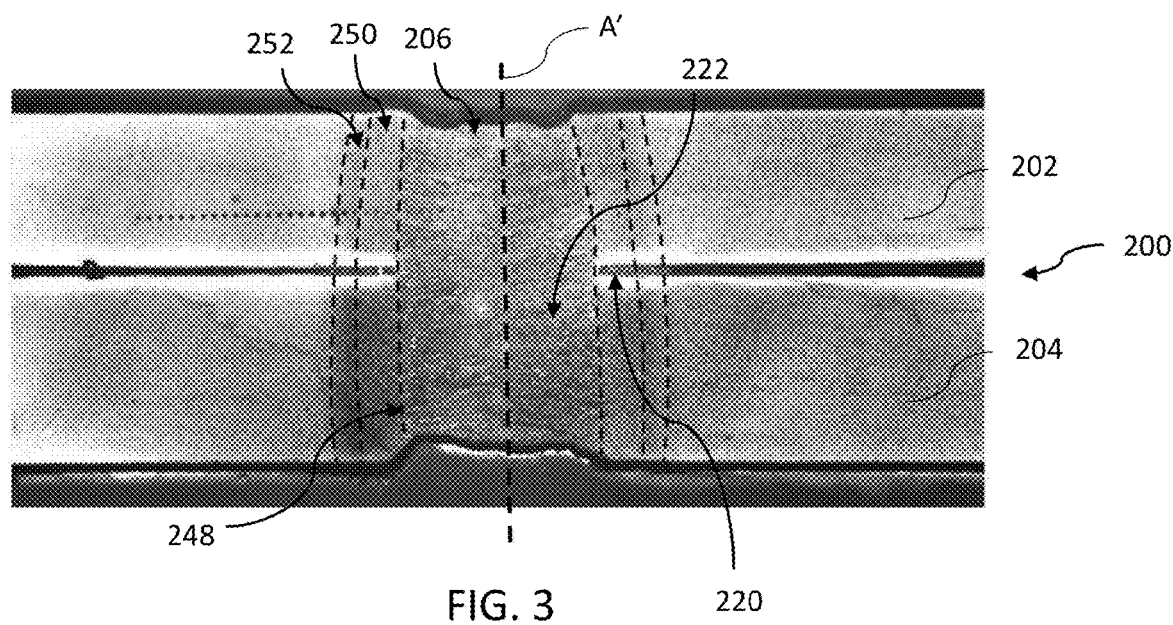
FIG. 3 is a micrograph of a cross-sectional area of a conventional laser welded assembly.

FIG. 3 is a micro-graph of a laser weld assembly 200 showing a shown cross-sectional area perpendicular to the laser weld seam 206. The laser weld seam 206 includes a core fusion zone 222 extending along an A'-axis penetrating the first work piece 202 and the second work piece 204 through the joint interface 220, thus fusing the first work piece 202 to the second work piece 204. The lateral boundary 248 of the core fusion zone 222 is substantially parallel with the A'-axis. Immediate adjacent to the core fusion zone 222 boundary is a heat affected zone (HAZ) that includes a hardened zone 250 immediately adjacent the fusion zone and an outer softened annealed zone 252. The hardened zone 250 includes a matrix of fine and coarse grain structures having a hardness of 400 to 500 HV and the annealed zone 252 includes an inter-critical (IC) and sub-critical (SC) heat affected zones having a hardness of 200 to 300 HV. Both the hardened and annealed zones 250, 252 extends in the same general direction as the A'-axis. Hardness degradation at the annealed zone 252 is a potential weak point in the laser welded assembly 200, leading to potential pre-mature fracture and strength weakening when the laser welded assembly 200 is subjected to high stress and/or strain forces.

Figure 4:
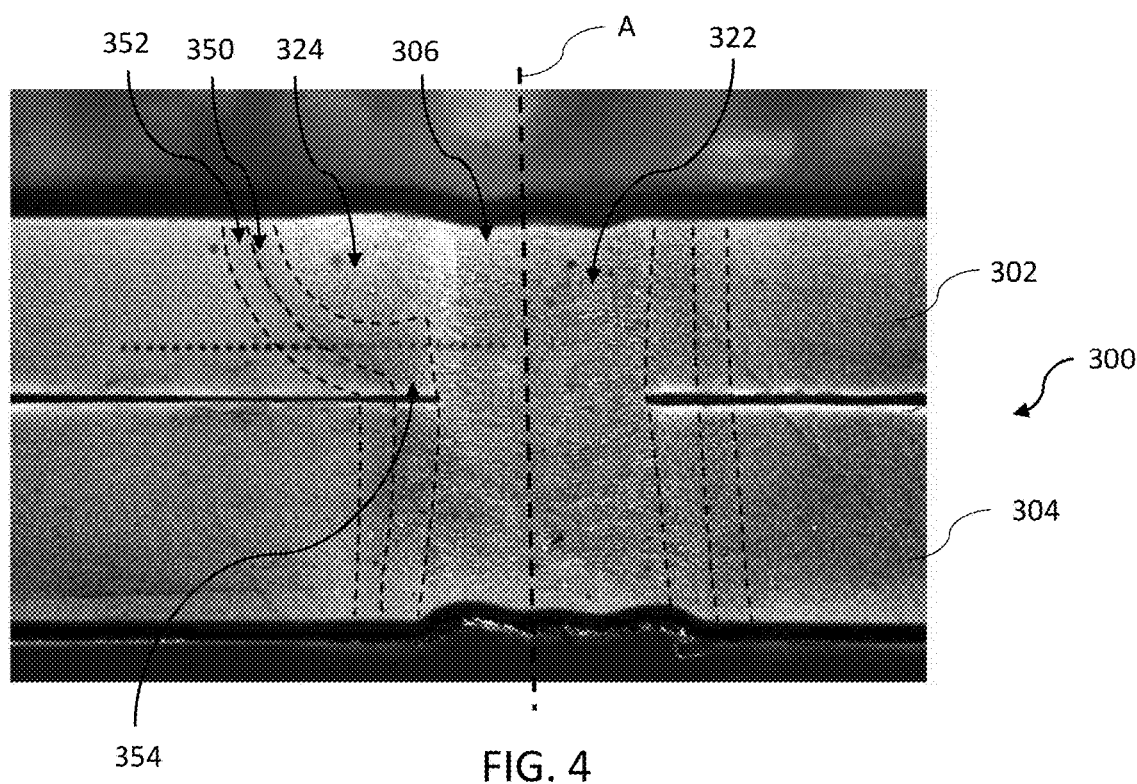
FIG. 4 is a micrograph of a cross-sectional area of a laser welded assembly having a HAZ reinforcement, according to an exemplary embodiment.

FIG. 4 is a micro-graph of a laser weld assembly 300 showing a shown cross-sectional area perpendicular to the laser weld seam 306. The laser weld seam 306 includes a core fusion zone 322 extending along an A-axis penetrating the first work piece 302 and the second work piece 304 through the joint interface 320, thus fusing the first work piece 302 to the second work piece 304. The fusion zone includes a laterally protruding fusion zone 324 that includes a curved fusion boundary above a notch root area 354. The laterally protruding fusion zone 324 alters the profiles of the heat affected hardened zone 350 and annealed zone 352, also referred to as a softened zone 352, thus moving the hardened zone 350 and soften zone 352 further away from the notch root area 354. The altered elongated path of the soften zone 352 delays crack initiation when the work piece 300 is subjected to excessive stress and/or strain. When a crack is initiated, the propagation path of the crack is directed along the altered elongated curve of the annealed softened zone 352. The delayed crack initiation and elongated crack propagation path results in a higher strength joint and larger energy absorption of the laser welded assembly 300.

Figure 5:
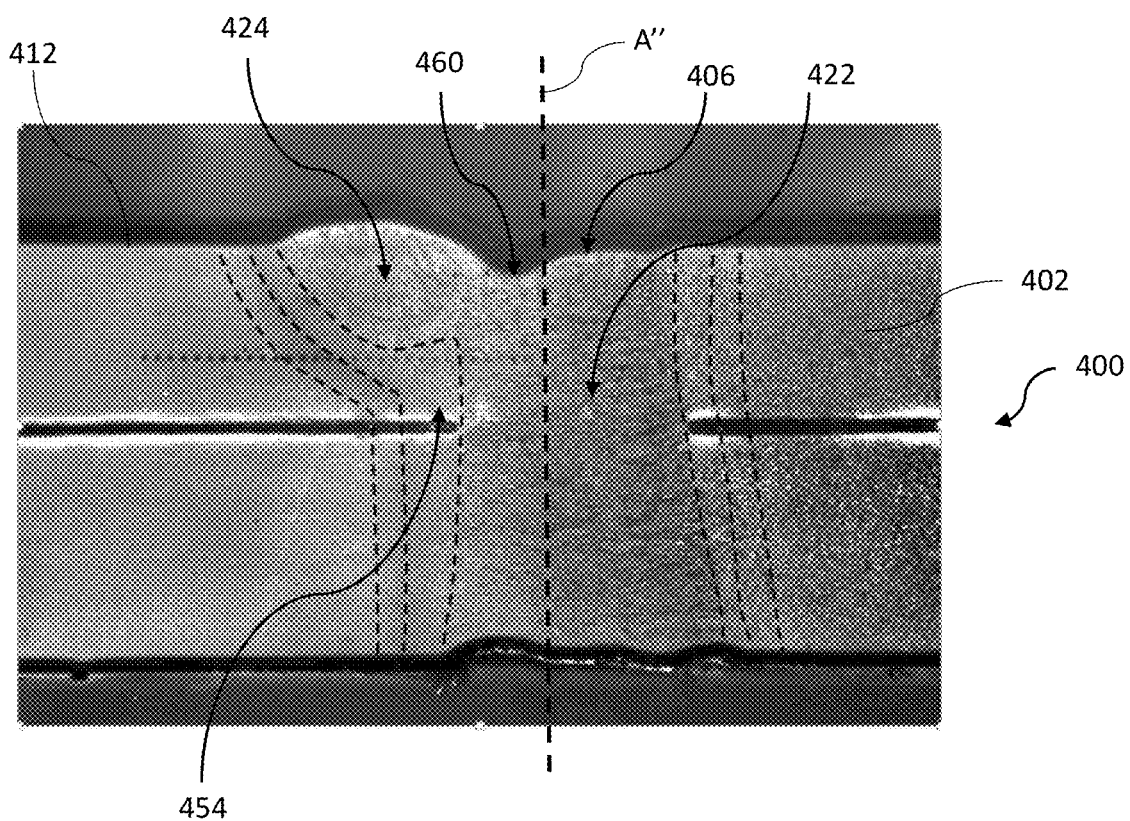
FIG. 5 is a micrograph of a cross-sectional area of a laser welded assembly having a surface groove adjacent to the HAZ reinforcement.

FIG. 5 is a micrograph of a laser welded assembly 400 showing a shown cross-sectional area perpendicular to the laser weld seam 406. The fusion zone includes a laterally protruding fusion zone 424 that includes a curved fusion boundary above the notch root area 454. However, the external surface 412 of the laser welded assembly 400 includes a surface groove 460 defined between the surface of the laterally protruding fusion zone 424 and the surface of the core fusion zone 422. The surface groove 460 is not desirable and may weaken the laser welded assembly 400 when excessive stress/strain forces are applied.

Figure 6:
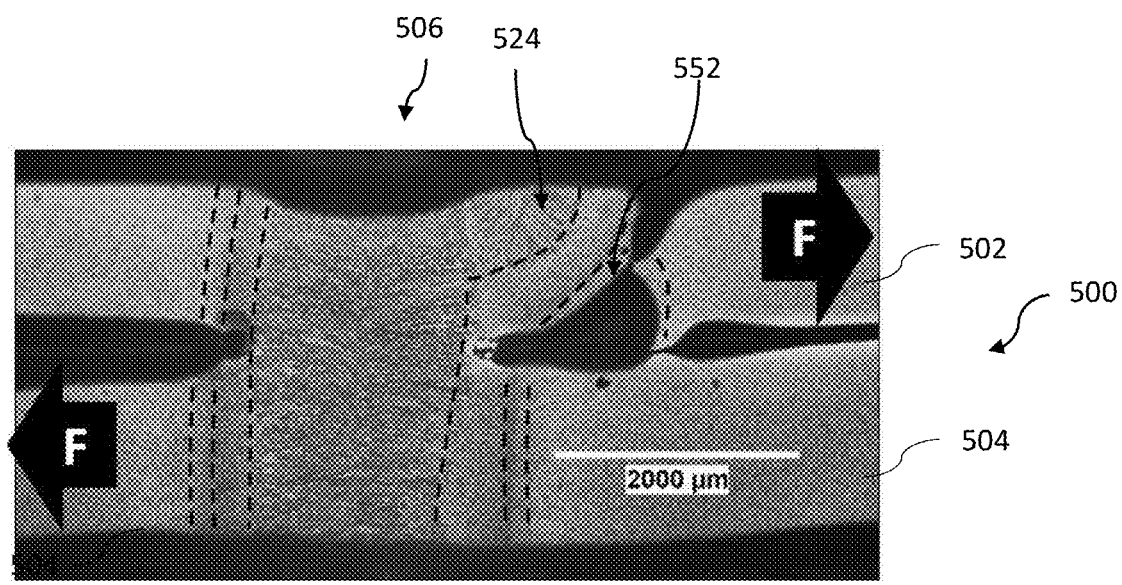
FIG. 6 is a micrograph of a cross-sectional area of a laser welded assembly having a HAZ reinforcement after undergoing a Lap-Shear Test.

FIG. 6 is a micrograph of a laser welded assembly 500 showing a shown cross-sectional area perpendicular to the laser weld seam 506. The laser welded assembly 500 was subjected to a Lap-Shear Test in which opposite shearing forces F were applied to the first work piece 502 and the second work piece 504 until the structural integrity of the laser welded assembly 500 failed. FIG. 6 shows the failure at along the heat affected anneal zone 552 that followed the curved boundary of the laterally protruding fusion zone 524. As compared to the result of the same test applied to the traditional laser welded assembly 200 of FIG. 3, the laser welded assembly 500 of FIG. 6 withstand a greater shear stress loading before failing.

Figure 7:
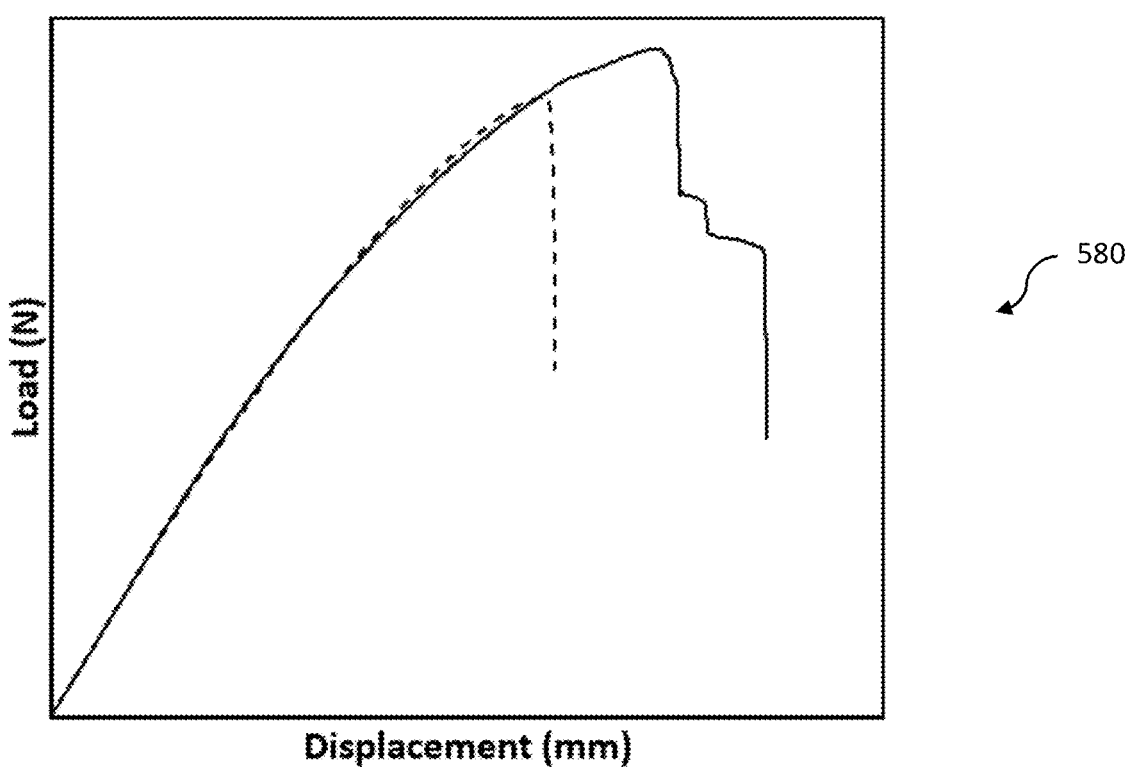
FIG. 7 is a graph comparing the results of a Lap-Shear Test of a laser welded assembly having a HAZ reinforcement to a traditional laser welded assembly.

FIG. 7 is a Load (N) vs. Displacement (mm) graph 580 showing the results of a Lap-Shear Test applied to the laser welded assembly 200 of FIG. 3 (shown as broken-line) as compared to a laser welded assembly 300 FIG. 4 (shown as a solid-line). The laser welded assembly 200 of FIG. 3 was subjected to a peak load of 45.2 kN and an Energy absorption of 40.1 J before failure. The laser welded assembly 300 of FIG. 4 was subjected to a peak load of 47.7 kN and an Energy absorption of 65.7 J before failure.

Figure 8:
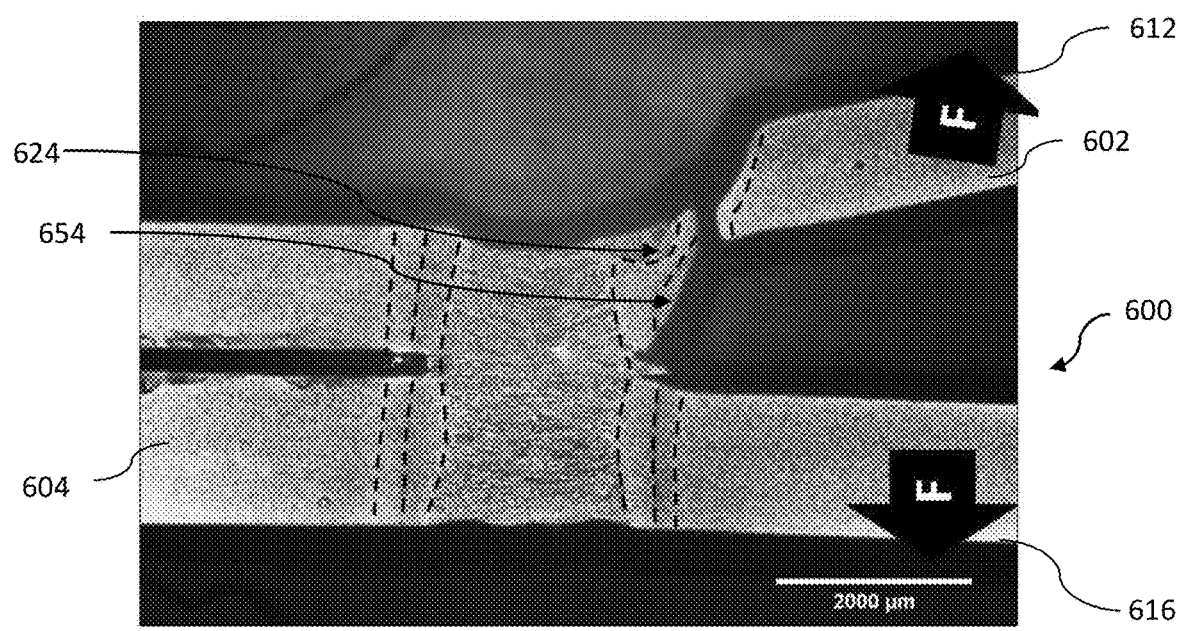
FIG. 8 is a micrograph of a cross-sectional area of a laser welded assembly having a HAZ reinforcement after undergoing a Coach-Peel Test.

FIG. 8 is a micrograph of a laser welded assembly 600 showing a cross-sectional area perpendicular to the laser weld seam 606. The laser welded assembly 600 was subject to a Coach-Peel Test in which opposite forces F were applied normal to the external surfaces 612, 616 of the first work piece 602 and the second work piece 604, respectively, until the structural integrity of the assembly 600 failed. FIG. 8 shows the failure at along the heat affected anneal zone 654 that followed the curved boundary of the laterally protruding fusion zone 624. As compared to the result of the same test applied to the laser welded assembly 200 of FIG. 3, the laser welded assembly 600 of FIG. 8 withstand a greater shear stress loading before failing.

Figure 9:
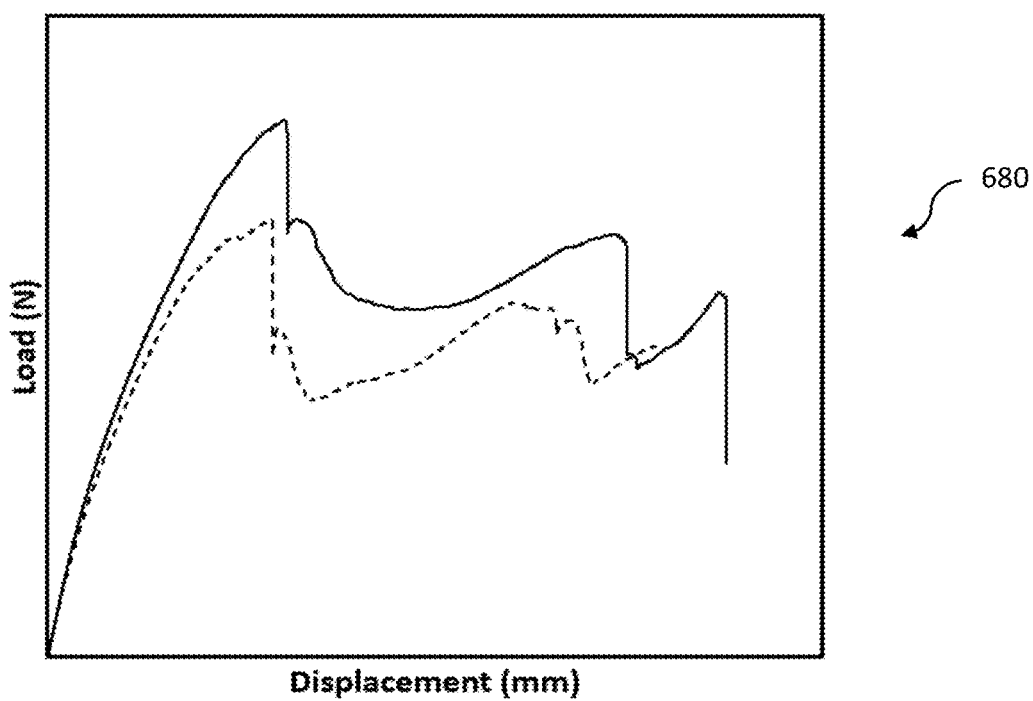
FIG. 9 is a graph comparing the results of a Coach-Peel Test of a laser welded assembly having a HAZ reinforcement to a traditional laser welded assembly.

FIG. 9 is a Load (N) vs. Displacement (mm) graph 680 showing the results of the Coach-Peel testing applied to the laser welded assembly 200 of FIG. 3 (shown as broken-line) as compared to the laser welded assembly 300 of FIG. 4 (shown as a solid-line). The laser welded assembly 200 of FIG. 3 was subjected to a peak load of 4.78 kN and an Energy absorption of 104.4 J before failure. The laser welded assembly 300 of FIG. 4 was subjected to a peak load of 5.87 kN and an Energy absorption of 137.6 J before failure.

Figure 10:
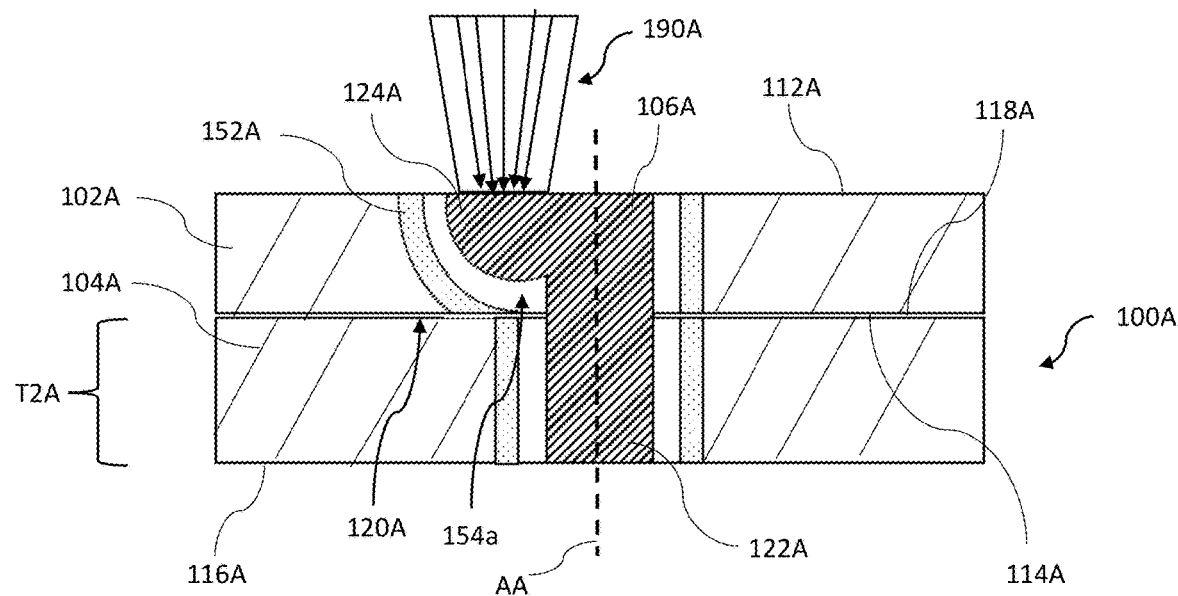
FIG. 10 is a schematic of a cross-sectional view of a laser welded assembly undergoing post-heating for making the HAZ reinforcement, according to an exemplary embodiment.
Figure 11:
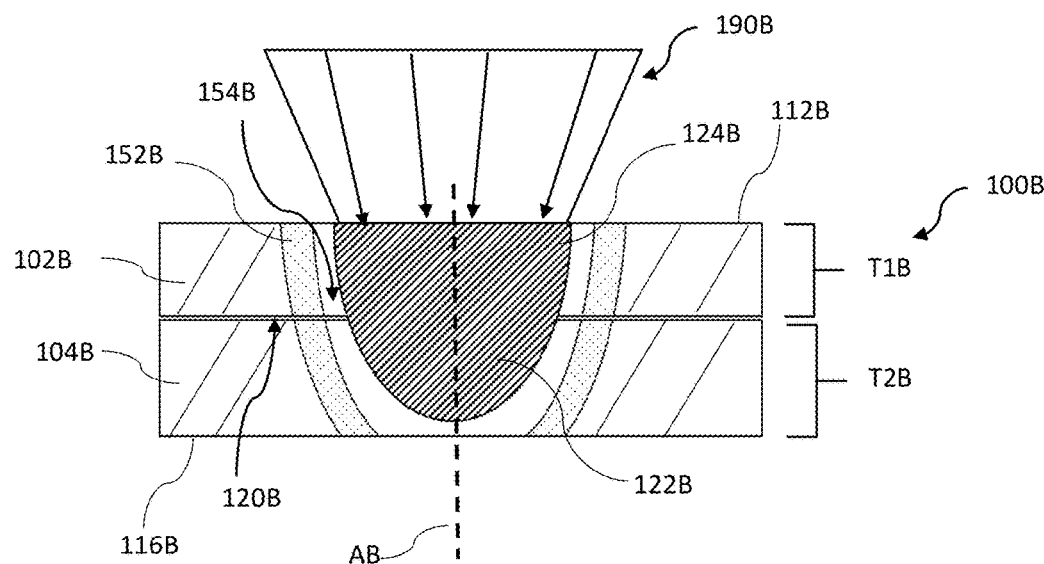
FIG. 11 is a schematic of a cross-sectional view of a laser welded assembly using a defocused laser for concurrently laser welding and making the HAZ reinforcement, according to an exemplary embodiment.
Figure 12:
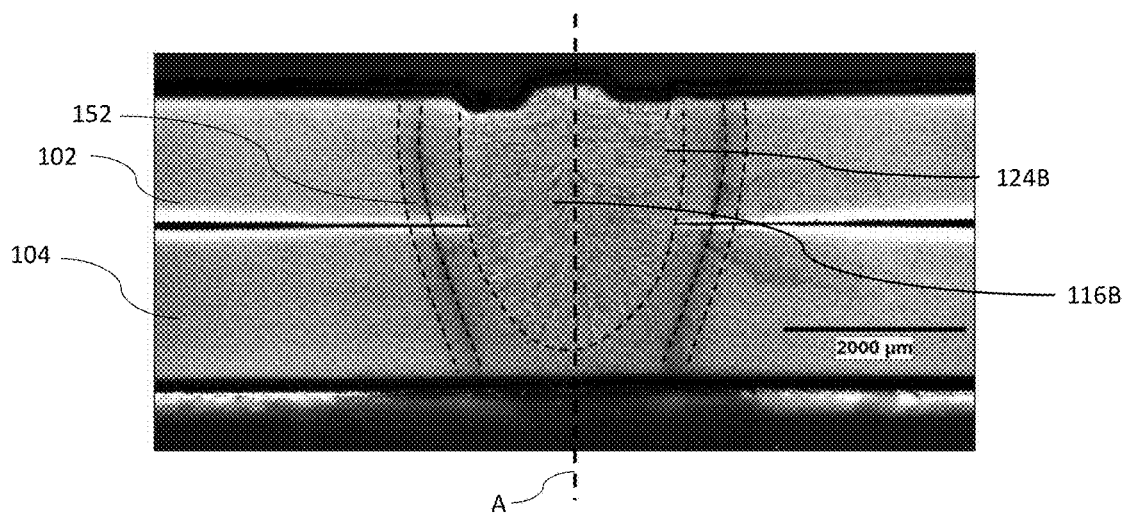
FIG. 12 is a micrograph of a cross-sectional view of a laser welded assembly using a defocused laser for concurrently welding and making the HAZ reinforcement, according to an exemplary embodiment.
Figure 13:
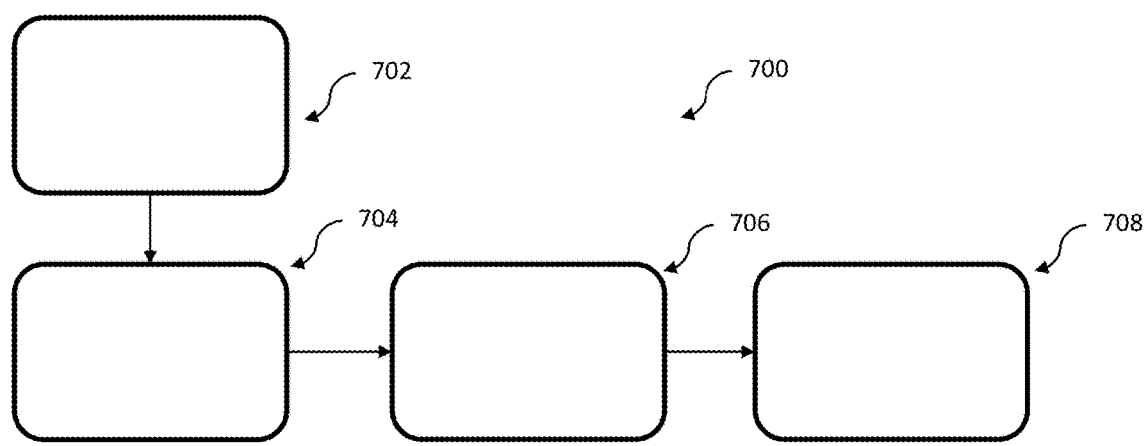
FIG. 13 is a block flow diagram showing a method for making a laser welded assembly have a HAZ reinforcement, according to an exemplary embodiment.

FIG. 10 is a schematic of a cross-sectional view of a laser welded assembly 100A undergoing post-heating by using a laser beam 190A for forming the laterally protruding fusion zone 124A. FIG. 11 is a schematic of a cross-sectional view of a laser welded assembly 1006 using a defocused laser 190B for concurrently forming the core fusion zone 122B and laterally protruding fusion zone 124B. FIG. 12 is a micrograph of a cross-sectional view of a laser welded assembly 100B using the defocused laser 190B for concurrently forming the core fusion zone 116B and laterally protruding fusion zone 124B. FIG. 13 shows a block flow chart 700 for a method of making a laser welded assembly 100 having a heat affected zone reinforcement including a laterally protruding fusion zone 124.

Referring to FIG. 10 and FIG. 13, the method begins in Block 702 by providing a metal first work piece 102A and a metal second work piece 104A. The first work piece 102A includes an external surface 112A, a faying surface 114A opposite the external surface 112A, and a thickness (T1) defined between the external surface 112A and the faying surface 114A of the first work piece 102A. Similarly, the second work piece 104A includes an external surface 116A, a faying surface 118A opposite the external surface 116A, and a thickness (T2) defined between the external surface 116A and the faying surface 118A of the second work piece 104A. The work pieces 102A, 104A are arranged and stacked such that the faying surface 114A of the first work piece 102A is in abutting contact with the faying surface 118A of the second work piece 104A.

Moving to Block 704, a laser beam is directed at the external surface 112A of the first work piece 102A and guided through a predetermined pattern to form a weld seam 106A. The laser beam 190A is set at a first predetermined weld schedule having a strength and speed sufficient to penetrate through the first thickness (T1), the joint interface 120A (also referred to as faying interface 120A), and at least partially into the second thickness (T2) to effectuate a laser welded seam 106A having a core fusion zone 122A joining the work pieces 102A, 104A.

An exemplary welding schedule is as follows:
Laser Power: 5.5 kW;
Speed: 350 mm/s;
Wobble type: Zigzag;
Width/amplitude of wobble: 0.8 mm; and
Distance/period length of wobble: 0.15 mm.

Moving to Block 706, immediately after forming the laser weld seam 106A in Block 704, the laser beam 190A is directed onto the external surface 112A of the first work piece 102A along a predetermined lateral portion of the laser weld seam 106A. This step is also referred to as post-heating. The predetermined lateral portion of the laser weld seam 106A is preferably the critical load bearing portion of the laser weld seam 106A that may be susceptible to cracking or fracturing due to excessive stress and/or strain forces. For example, in the C-shaped laser weld seam 106 shown in FIG. 1, the predetermined lateral portion may include the right side of the linear segment 106b, the left side of the linear segment 106b, the outside of the first curved end portion 106a, and/or the outside of the second curved end portion 106c.

The welding laser beam 190A is set at a second welding schedule having a predetermine strength and speed sufficient to penetrate into a portion of first thickness (T1A) proximal to the joint interface 120 to melt the material there-through to effectuate a laterally protruding fusion zone 124 having a tapered or curved boundary extending from the core fusion zone 122. The strength of the welding laser beam is limited such that sufficient heat does not penetrate into the second work piece 104A to form a molten material in the second thickness (T2) of the second work piece 104A. An exemplary laser welding schedule for post-heating is as follows:
Laser Power: 2 kW;
Speed: 200 mm/s; and
Defocus: 15 mm.

An appropriate post-heating schedule should be applied to avoid forming a groove on the surface of the first work piece 102A between the primary fusion zone and the laterally protruding fusion zone 124A. If a surface groove is produced, then the welding laser beam is directed closer to the laser weld seam 106A and the laser beam 190A may be defocused if necessary. Alternative heat sources such as an electron beam may be used in place of the laser beam 190A.

Referring to FIG. 11, alternatively, Blocks 704 and 706 may be combined into one step by directing a defocused laser beam 190B having a predetermine strength and speed sufficient to penetrate through the first thickness (T1B), joint interface 120B, and at least partially into the second thickness (T2B) to effectuate a laser weld seam 106 having a core fusion zone 122B and a laterally protruding fusion zone 124B in the first thickness (T1B). It is preferable that the defocused laser beam radius is at least the first thickness (T1) of the first work piece 102 when no beam oscillation is used. Otherwise, the oscillation amplitude is preferred to be at least the first thickness (T1) of first work piece 102.

In Block 708, the laser welded assembly is allowed to cool and the core fusion zone 122A, 122b solidifies, thus fusing the first work piece 102A, 102b to the second work piece 104A, 104B. The laterally protruding fusion zone 124A, 124B alters the profiles of the annealed zone 152A, 152B by moving it further away from the notch root area 154A, A154B as shown in FIGS. 10 and 11.

The method provides a laser welded assembly provides a laterally protruding fusion zone that defines a curved fusion zone boundary above the notch root area of the assembly. The curved fusion zone boundary alters the profile of the softened zone 352 by moving the soften zone 352 further away from the notch root area 354. The altered soften zone 352 follows the elongated curved boundary of the protruding fusion zone. When a crack is initiated due to excessive stress or stain asserted on the laser welded assembly, the propagation path of the crack is directed along the path of the altered elongated curve annealed softened zone 352. The elongated crack propagation path results in a higher strength joint and larger energy absorption of the laser welded assembly 300.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A welded assembly comprising,
   a first work piece having an external surface, a faying surface opposite the external surface, and a cross-sectional thickness (T1) defined between the external surface and the faying surface of the first work piece;
   a second work piece having an external surface, a faying surface opposite the external surface, and a cross-sectional thickness (T2) defined between the external surface and the faying surface of the second work piece, wherein the faying surface of the first work piece is in abutting contact with the faying surface of the second work piece to define a faying interface;
   a weld seam having a core fusion zone extending completely through the first work piece from the external surface of the first work piece through the faying interface and at least partially into the cross-sectional thickness (T2) of the second work piece, wherein the weld seam includes a center linear segment extending along the external surface of the first work piece; and
   a protruding fusion zone extending laterally from at least one side of the core fusion zone and extending vertically through only a portion of the cross-sectional thickness (T1) from the external surface to proximal to the faying surface of the first work piece.

2. The weld assembly of claim 1, wherein the protruding fusion zone includes a curved boundary defined between a first radius (R1) adjacent to the external surface of the first work piece and a second radius (R2) proximal to the faying interface, wherein the first radius (R1) and second radius (R2) extend radially from an axis along the core fusion zone and wherein the first radius (R1) is greater than the second radius (R2).

3. The weld assembly of claim 2, wherein the first work piece includes a softened anneal zone following the boundary of the protruding fusion zone.

4. The weld assembly of claim 3, wherein the boundary of the protruding fusion zone includes a bowl shape profile defined between the first radius (R1) and the second radius (R2).

5. The weld assembly of claim 4, wherein a tangent line (L) extending from a point on the boundary of the protruding fusion zone to the faying interface at the core fusion zone defines an angle (a) less than 90 degrees relative to the faying interface.

6. The weld assembly of claim 5, wherein the angle (a) is between about 15 degrees to about 75 degrees.

7. The weld assembly of claim 1, wherein the protruding fusion zone is formed by post-heating the first work piece by directing a laser onto the external surface of the first work piece along a predetermined lateral portion of the core fusion zone.

8. The weld assembly of claim 1, wherein the protruding fusion zone is concurrently formed with the core fusion zone by directing a defocused laser onto the external surface of the first work piece.

9. The weld assembly of claim 1, wherein the weld seam is a laser weld seam.

10. A laser welded automotive structural component comprising:
    a first work piece having an external surface, a faying surface opposite the external surface, and a cross-sectional thickness (T1) defined between the external surface and the faying surface of the first work piece;
    a second work piece having an external surface, a faying surface opposite the external surface, and a thickness (T2) defined between the external surface and the faying surface of the second work piece, wherein the faying surface of the first work piece is in abutting contact with the faying surface of the second work piece to define a faying interface;
    a weld seam having a core fusion zone extending from the external surface of the first work piece through the faying interface and at least partially into the thickness (T2) of the second work piece, wherein the weld seam includes a center linear segment extending along the external surface of the first work piece; and
    a protruding fusion zone extending laterally from the core fusion zone through a portion of the cross-sectional thickness (T1) from the external surface to proximal to the faying surface within the first work piece, wherein the protruding fusion zone extends along at least one side of the center linear segment;
    wherein the weld seam defines an elongated C-shape extending from an end of the center linear segment, and
    wherein the protruding fusion zone is adjacent to a predetermined portion of the elongated C-shape.

11. The laser welded automotive structural component of claim 10, wherein the protruding fusion zone includes a boundary defined between a first radius (R1) adjacent to the external surface of the first work piece and a second radius (R2) proximal to the faying interface, wherein the boundary defined between the first radius (R1) and second radius (R2) defines a curved bowl shape profile, and wherein R1 is greater than R2.

* * * * *